June 28, 1938.  P. GELDER  2,121,868
REFLECTING SAFETY DEVICE
Filed May 28, 1936

Inventor
Percy Gelder

Patented June 28, 1938

2,121,868

UNITED STATES PATENT OFFICE 2,121,868

REFLECTING SAFETY DEVICE

Percy Gelder, Willowdale, Ontario, Canada

Application May 28, 1936, Serial No. 82,264

5 Claims. (Cl. 88—81)

The principal objects of this invention are to reduce the hazards of cycling on the highway at night and to provide a simple but effective form of device which may be readily attached to a conventional form of bicycle pedal and be supported thereby in a position which will provide for the unobstructed reflection of warning rays and which will provide a signal visible to the front and the rear of the cycle to which the device is applied.

A further object is to provide a form of device for this purpose which will not only be of light construction but will be ruggedly braced and provide for the protection of the reflecting element against accidental damage and to ensure that the reflective signal will be projected in the desired direction.

The principal feature of the invention resides in the novel construction of a reflector-supporting bracket adapted to be directly secured to the outer end of a conventional cycle pedal and to support reflector elements clear thereof at the outer side of the foot of the cyclist.

In the drawing, Figure 1 is a perspective view of my improved reflector device showing the same attached to a bicycle pedal.

Figures 1, 2, 3, 4:
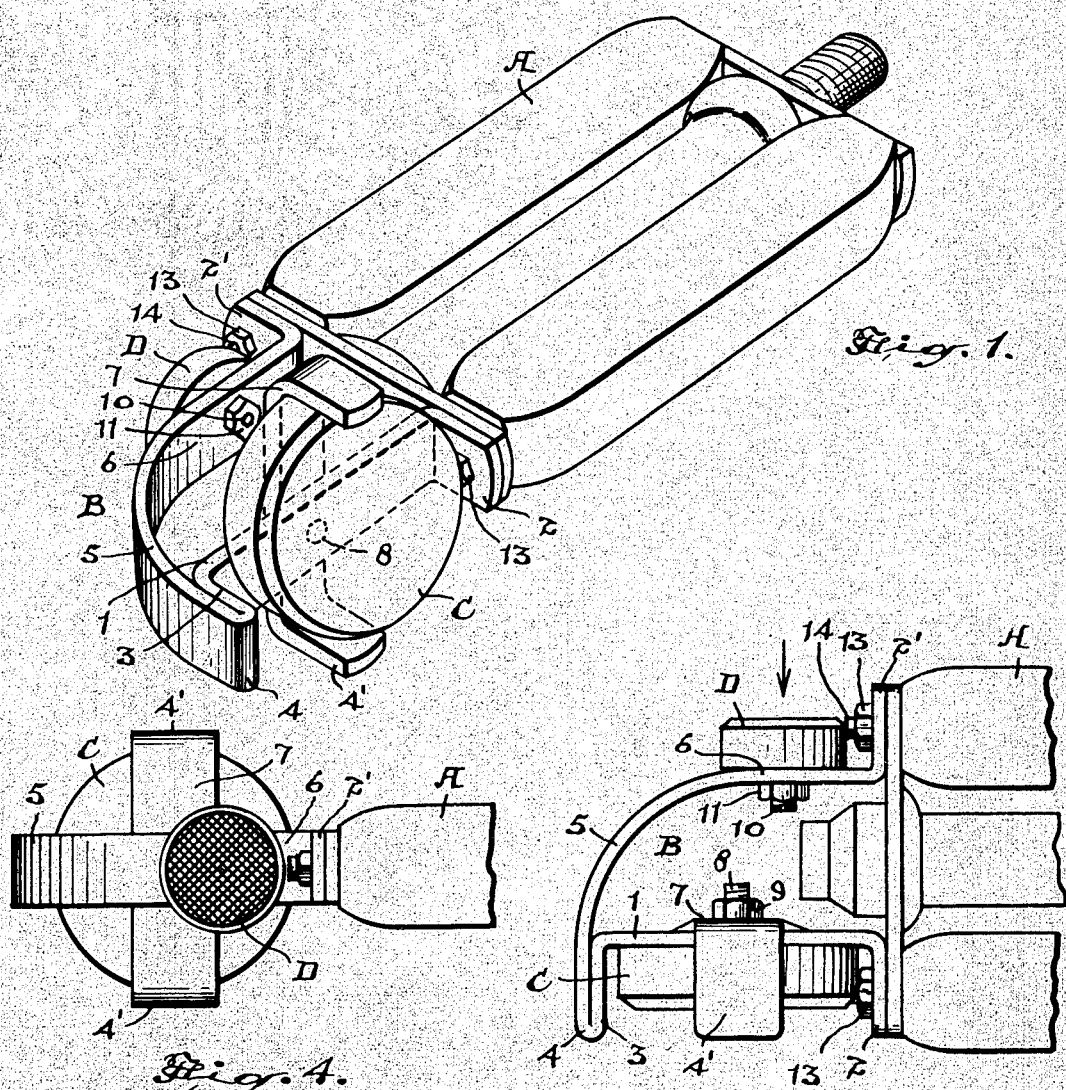
Figure 2 is a plan view showing same attached to the cycle pedal, a portion only of which is shown.
Figure 3 is a side elevational view of the device showing same detached from the pedal and looking in an outward direction.
Figure 4 is a front elevational view of the device looking in the direction of the arrow, Figure 2.

In the use of bicycles on the highway after dark it is extremely desirable to provide a dependable form of signal device which will warn approaching motorists of the presence of a cycle on the highway and various proposals have been made in this connection from time to time and the present invention proposes an improved form of device which may be supported in such a manner on the bicycle pedal that it will present an effective moving signal which will not be obstructed in any way by the presence of the cyclist's foot on the pedal and which wil be adequately protected against damage.

In the accompanying drawing, I have illustrated a preferred form of my invention showing the manner in which the same may be attached to a conventional bicycle pedal A in a very simple manner.

The device herein shown comprises a protective supporting bracket indicated in general by the letter B, which is shown made of a single length of flat metal bar material having a substantially straight portion 1, the terminal end of which is turned laterally to form a fastening lug 2 and the other end of the straight portion 1 is turned laterally parallel with the lug 2 and provided with a return bend as shown at 3 forming a protective lug projection 4 and the bar is curved forwardly and inwardly to present a curved guard plate portion 5 and a substantially straight portion 6 which is shown parallel with the straight portion 1 and having its inward end extremity turned laterally to form an attachment lug 2', similar to the lug 2.

A U-shaped metal guard 7 is formed of a length of light metal bar stock and is secured centrally of the straight portion 1 of the bracket element, either by welding or otherwise, and the lug portions 4' thereof project rearwardly forming protective guards and a reflector element C of suitable design is here shown secured to the portion 1 of the bracket by means of a bolt 8, which is shown passing through the overlapped portions of members 1 and 7 and secured by the nut 9, which nut and bolt may serve the function of securing the member 7 to the member 1 in right angular relation thereto.

The lugs 4 and 4' and also the lug 2 project beyond the rear surface of the reflector element C at spaced points about the periphery thereof and serve to protect same against damage.

A smaller reflector element D is here shown secured to the straight portion 6 of the bracket by means of a bolt 10 and nut 11 and it will be noted that this reflector as well as the reflector C is supported in inwardly offset relation to the forward and rearward surface extremities of the pedal A, so that they will be less likely to come into damaging contact with objects than if they projected beyond the pedal in the fore and aft direction.

On reference to Figure 3 it will be noted that the attachment lugs 2 and 2' have horizontally elongated slots 12 and in attaching the device to a standard pedal it is only necessary to loosen the nuts 13 of the pedal assembly and by removing same the bolts 14 of the pedal structure are entered in the elongated slots 12 and the nuts 13 again tightened into place to securely clamp the device to the pedal, the elongated formation of the slots 12 providing for variation in the distances between the bolts 14 of various types and sizes of pedals.

It will also be observed on reference to Figure 2 that the device is so proportioned that the preponderance of weight is disposed at one side of the pedal axis, here shown on the side on which the larger rear reflector C is arranged, so that the pedals will normally rest, when not in use, with the reflector C downward, with the result that when the feet of a cyclist are applied to the pedals with a natural forward movement, the pedals will be rotated a quarter revolution, bringing the reflector C into the proper relation to project a reflected warning signal to the rear of the cycle.

It will be readily appreciated that while I have shown and described a specific structure for carrying my invention into practice, many variations may be made without departing from the essential spirit of the invention, which is to provide a device which may be quickly attached to the outward end of the existing pedal structure to provide a warning signal.

What I claim as my invention is:—

1. A reflecting safety device for attachment to the outer end of a cycle pedal comprising in combination a bracket having spaced lugs disposed in a common plane and adapted to overlap the outer end of the pedal and be secured thereto at opposite sides of the pedal axle, said bracket extending in substantially right angular relation to said plane and terminating at the outward end in a protective guard, and a pair of reflectors mounted on said bracket in substantially parallel planes disposed substantially in right-angular relation to the plane of disposition of said lugs and facing in opposite directions to provide a fore and aft reflective signal when the device is in mounted position on a pedal, said reflectors being confined between the plane of disposition of said attachment lugs and the outer guard extremity of the bracket with the said guard extremity projecting beyond the extremity of the reflectors farthest from said spaced lugs to protect said reflectors from damage.

2. A safety signal device for attachment to the outer end of a cycle pedal, comprising a bracket, means on said bracket adapted to co-operate with the pedal structure to support the bracket in a projecting position beyond the outer end of the pedal, said bracket having a series of laterally projecting protective lugs disposed about a common centre and adapted when the bracket is in mounted position on the pedal to project rearwardly, and a reflector element secured to said bracket in a substantially central position between said protective lugs with the latter projecting beyond the face thereof to protect the same against damage.

3. A safety signal device as claimed in claim 2 in which said bracket includes crossed U-shaped portions the ends of which project to form the protective lugs and the reflector is secured thereto at their point of crossing.

4. A safety signal device for attachment to the outer end of a cycle pedal comprising, a single strip of metal doubled upon itself intermediate of its length to form a protective guard lug adapted to project in the fore and aft direction when the device is in mounted position on a pedal, one portion of said strip being bent abruptly laterally to extend substantially parallel to the pedal axis when the device is mounted, the other portion of the doubled strip being bent for a portion of its length into divergent relation to the aforesaid parallel portion to form a protective guard and having a portion thereof adjacent the end arranged substantially parallel with the first-mentioned parallel portion, said respective portions terminating in attachment lugs adapted to be secured to the pedal structure to support the device in a position projecting well beyond the outer end thereof, said parallel portions forming supports for fore and aft reflectors respectively, and fore and aft reflectors secured respectively to and supported by said parallel portions in substantially parallel planes, said guard lug being positioned beyond the edge farthest from the attachment lugs of the reflector carried by the first-mentioned portion of said metal strip.

5. A safety signal as claimed in claim 4 in which paired guard lugs connected with and supported by said first-mentioned parallel portion are arranged in spaced relation to said guard lug and the attachment lug of the first-mentioned portion to project respectively below and above the lower and upper extremities of the reflector mounted on said first-mentioned portion when the device is in normal position.

PERCY GELDER.